United States Patent
Lazear et al.

(10) Patent No.: US 11,984,714 B1
(45) Date of Patent: May 14, 2024

(54) PASS THROUGH JUNCTION BOX DEVICE

(71) Applicant: Jasco Products Company LLC, Oklahoma City, OK (US)

(72) Inventors: Trey Lazear, Oklahoma City, OK (US); Mark Solomon, Oklahoma City, OK (US); Walter Curtis Gobble, Oklahoma City, OK (US)

(73) Assignee: Jasco Products Company, LLC, Oklahoma City, OK (US)

( * ) Notice: Subject to any disclaimer, the term of this patent is extended or adjusted under 35 U.S.C. 154(b) by 535 days.

(21) Appl. No.: 17/175,622

(22) Filed: Feb. 13, 2021

Related U.S. Application Data

(60) Provisional application No. 62/977,125, filed on Feb. 14, 2020.

(51) Int. Cl.
*H02G 3/08* (2006.01)

(52) U.S. Cl.
CPC ............. *H02G 3/085* (2013.01); *H02G 3/086* (2013.01); *H02G 3/088* (2013.01)

(58) Field of Classification Search
CPC ......... H02G 3/085; H02G 3/086; H02G 3/088
USPC ......................................................... 220/3.2
See application file for complete search history.

(56) References Cited

U.S. PATENT DOCUMENTS

| | | | |
|---|---|---|---|
| 9,640,960 B2 * | 5/2017 | Makwinski | H02G 3/0608 |
| 2012/0222880 A1 * | 9/2012 | Dinh | H02G 3/14 174/50 |
| 2017/0279257 A1 * | 9/2017 | Wurtz | H02G 3/086 |
| 2019/0173246 A1 * | 6/2019 | Smed | H02M 7/003 |
| 2019/0229458 A1 * | 7/2019 | Byrne | H01H 9/02 |
| 2021/0119431 A1 * | 4/2021 | Hagen | H02G 3/0625 |
| 2021/0135390 A1 * | 5/2021 | Byrne | H01R 31/02 |
| 2022/0051864 A1 * | 2/2022 | Daoura | H01H 71/1009 |

FOREIGN PATENT DOCUMENTS

| | | | | |
|---|---|---|---|---|
| CA | 2754321 A1 * | 4/2012 | | G04G 15/006 |
| CA | 3031045 A1 * | 7/2019 | | H01H 9/02 |
| WO | WO-2017155855 A1 * | 9/2017 | | H02G 3/085 |

* cited by examiner

*Primary Examiner* — J. Gregory Pickett
*Assistant Examiner* — Niki M Eloshway
(74) *Attorney, Agent, or Firm* — William Popejoy

(57) ABSTRACT

The present invention pertains to devices and applications for electrical enclosures designed with one or more mounting methods with one or more input openings for electrical power and one or more openings for installation of electrical delivery products which provide a means for mechanically mounting or connecting, and providing electrical power to at least one connected electrical apparatus. More specifically, the invention pertains to outdoor, weather resistant, electrical junction boxes with rear openings and side conduit removable plugged openings for input of electrical power, weather resistant GFCI outlets with outlet covers and a junction box cover which provide an electrical junction box mechanical interface for mounting and providing electrical power to a connected electrical apparatus such as a lighting apparatus, security camera, etc.

17 Claims, 10 Drawing Sheets

PASS THROUGH JUNCTION BOX DEVICE

RELATED APPLICATION

This application claims priority from commonly assigned U.S. Provisional Patent Application Ser. No. 62/977,125, filed February 14th, 2020, entitled PASS THROUGH JUNCTION BOX, the entire disclosure of which is hereby incorporated by reference.

BACKGROUND OF THE INVENTION

1. Field of the Invention

The present invention pertains to devices and applications for electrical enclosures designed with one or more mounting methods with one or more input openings for electrical power and one or more openings for installation of electrical delivery devices which provide a means for mechanically mounting or connecting, and providing electrical power to at least one connected electrical apparatus. More specifically, the invention pertains to outdoor, weather resistant, electrical junction boxes with rear openings and side conduit removable plugged openings for input of electrical power, weather resistant GFCI outlets with outlet covers and a junction box cover which provide an electrical junction box mechanical interface for mounting and providing electrical power to a connected electrical apparatus such as a lighting apparatus, security camera, or other electrical device.

2. Description of the Related Art

Currently, junction boxes hardwire and mount a connected light fixture or other electrical device. The boxes do not provide the ability to control the power to the connected light fixture or electrical product. There also exist electrical enclosures which give access to an electrical outlet, GFCI or standard. These also do not provide the ability within the product to control the power to an electrical outlet. The prior art includes light fixtures which have incorporated a light fixture with a GFCI electrical outlet. These fixtures do not provide the ability within the device to control the power to either the connected light fixture or to the GFCI outlet. For these devices, either the connected light fixture and GFCI outlet are off, or both are on with power being controlled by the house power supply. In addition, since the GFCI is integrated into the fixture, if a consumer wants a different fixture with a GFCI outlet, they are limited to the few light fixtures that have this combination of devices. With the current invention, any light fixture designed to be mounted to a standard junction box can be mounted to the device.

Additionally, light fixtures with GFCI outlets incorporated into the product do not allow for items to be plugged in while being in a wet/damp location. They do not have a standard GFCI "Extra Duty" cover which allows devices to be plugged in while also meeting the requirements for wet/damp location usage. For these devices, they are only wet location rated when nothing is plugged into the outlets and the cover is closed. As such, the outlets can only be used under dry conditions. Furthermore, embodiments of the current invention allow separate control of the power to the connected light fixture from the GFCI outlet within the device.

The concept was created from the original idea of adding electrical outlets to the base of a security light. Since this would only provide outlets to a specific security light, the original idea was changed to create an electrical junction box which would provide electrical outlets and allow any product that mounts to a standard electrical junction box to be provided with power.

At present, prior art includes electrical enclosures designed with inputs for electrical power and mounting for electrical outlets and there are electrical junction boxes with inputs for electrical power which provide mechanical mounting for a connected electrical apparatus. However, no electrical enclosure with inputs for electrical power that provides both a mechanism for installing electrical delivery products, such as electrical outlets, and that provides a means for mechanically mounting a connected electrical apparatus exist in the prior art.

SUMMARY OF THE INVENTION

The current invention includes outdoor, weather resistant, electrical junction boxes with rear openings and side conduit removable plugged openings for input of electrical power, weather resistant GFCI outlets with outlet covers and a junction box cover which provide a standard 4" round electrical junction box mechanical interface for mounting and providing electrical power to a connected electrical apparatus such as a lighting apparatus, security camera, etc. The entire enclosure is designed to mount to a recessed standard 4" round electrical junction box, a surface mount standard 4" electrical junction box, or may be mounted to a flat surface.

The devices may also include a solid electrical junction box cover which would provide no connected product mounting or power.

One embodiment of the pass through junction box device routes input AC power through one WiFi controller, which provides WiFi based on/off and timer control of the 15A GFCI outlets and a second WiFi based on/off and timer control of a 5A maximum connected lighting apparatus.

Another embodiment of the pass through junction box device routes input AC power directly to 15A GFCI outlets and to a manual on/off 5A switch which provides power to a connected lighting apparatus.

The most basic embodiment of this invention is described in the paragraphs above. However, numerous variations of this inventions exist and are understood by one having skill in the art.

Embodiments include electrical enclosures designed with one or more mounting methods with one or more input openings for electrical power. However, the specific implementation is an outdoor, weather resistant, rectangular electrical junction box with rear openings and side conduit plugged openings for input of electrical power. The entire enclosure is designed to mount to a recessed standard 4" round junction box, a surface mount standard 4" junction box, or could be mounted to a flat surface.

The shape of the enclosure is not limited to a rectangular junction box but could be cylindrical, square, round or any number of other shapes. The enclosure is not limited to being weather resistant since there are applications where this may be used indoors and not exposed to weather.

The openings for input power are not limited to holes in the rear and screw in conduit connector openings on the sides, but could include any number of inputs on the rear or sides such as removable knockouts, screw in conduit connector openings, armored cable inputs, strain relief inputs, etc. The enclosure does not require all the mounting options described but could provide any singular version of the mounting options or additional mounting options.

Embodiments may have one or more openings for installation of electrical delivery devices. The devices may be pre-installed weather resistant GFCI outlets with GFCI outlet covers. However, other variations of the device may include pre-installed one or more electrical delivery devices such as duplex outlets, single outlets, standard outlets, standard weather resistant outlets, GFCI outlets, GFCI weather resistant outlets, other in-wall electrical delivery products such as in-wall USB products (USB-A, USB-micro, USB-C, etc), in-wall combinations of electrical outlets and USB products, in-wall products with built-in lighting, or any number of other electrical delivery devices, 3.5 mm DC outputs, any variation of AC or DC outputs, and any variation of power connectors.

The device may include WiFi control of the 15A GFCI outlets and WiFi control of the 5A power to the connected lighting product and may include a manual switch control of the connected lighting product. Numerous combinations and variations of the device are understood by those having skill in the art. The mounted electrical apparatus and electric delivery apparatus may have continuous power, both may be manually switched, both may be wirelessly controlled via RF, Bluetooth, WiFi, Zigbee, Zwave or any other wireless transmission method via a remote or via a computer, mobile device or web-based application. The device may comprise a combination of manual switches and wireless control. The switching mechanisms may support an input of varying AC/DC voltages and output of varying AC/DC voltages and varying AC/DC currents.

Embodiments may provide a means for mechanically mounting and providing electrical power to a connected electrical apparatus. The junction box device may provide a standard 4" electrical junction box mechanical interface for mounting and providing electrical power to a connected electrical apparatus such as a lighting apparatus, security camera, etc. The mounting mechanism provided may be for a standard 4" junction box of up to 50 lbs, however, this should not be limited to this mounting mechanism, but any number of mountings and any number of electrical devices requiring mounting and electrical power. The provided electrical power may only pass through the input electrical power or may also condition the input power to any output AC or DC output to support the connected product. The electrical connection to the connected electrical apparatus may be any number of connections.

Embodiments may comprise additional electrical outlets which otherwise may not be readily available while providing mounting and electrical power for a connected electrical apparatus such as a light fixture. The manual and wireless switching options provide control over the connected electrical devices and apparatuses.

In an another embodiment, the consumer through the use of Wi-Fi, has complete and separate on/off and scheduling control for the connected light or the GFCI outlets. For embodiments without Wi-Fi, the GFCI outlets may always have power, but the consumer may manually turn on/off the connected light with a switch. Other versions of this product may include an additional manual switch to control the GFCI outlet, or any combination of Wi-Fi and manual switch control.

Embodiments of the current invention may contain a removable piece/assembly (GFCI) that is screwed from the inside of the box having advantages over alternate designs. The ability to remove the GFCI outlets screwed from inside the box allows for the smallest design in the height and width of the product while maintain the wet/damp location ratings. The enclosure opening only has to accommodate the standard rectangular shape of the face of the outlet as compared to a larger enclosure that would be necessary to also accommodate the top and bottom yokes of an outlet assembly and the full width of a GFCI outlet assembly.

If the GFCI fails, a consumer may easily remove and insert a new GFCI or standard outlet. If the consumer wants different functionality, they may remove the GFCI outlet and replace it with any number of in-wall electrical products with the standard rectangular front face.

Numerous in-wall electrical outlets may be installed in place of the GFCI outlet to give the consumer more flexibility in having access to electrical power separate from the connected light fixture. Embodiments include, but not limited to: In-Wall four USB-A, In-Wall two standard outlet (non-GFCI) with USB-A and USB-C, In-Wall four USB, In-Wall two USB and 12V automotive style connecter 12V DC supply, and In-Wall audio control module.

It should be appreciated that combinations of the foregoing concepts and additional concepts discussed in greater detail below are contemplated as being part of the inventive subject matter disclosed herein. In particular, all combinations of claimed subject matter appearing at the end of this disclosure, or elsewhere herein, are contemplated as being part of the inventive subject matter.

These and other systems, methods, objects, features, and advantages of the present invention will be apparent to those skilled in the art from the following detailed description of the preferred embodiment and the drawings.

BRIEF DESCRIPTION OF THE DRAWINGS

One or more embodiments are illustrated by way of example, and not by limitation, reference will now be made to the accompanying drawings, having the same numeral designations to represent like elements throughout and wherein.

Figure 1:
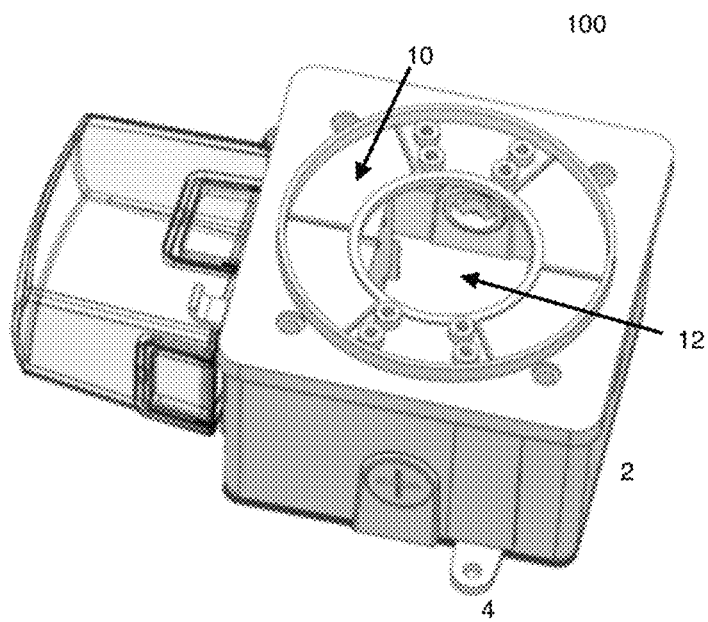
FIG. 1 is a perspective view of an embodiment of the pass through junction box.
Figure 2:
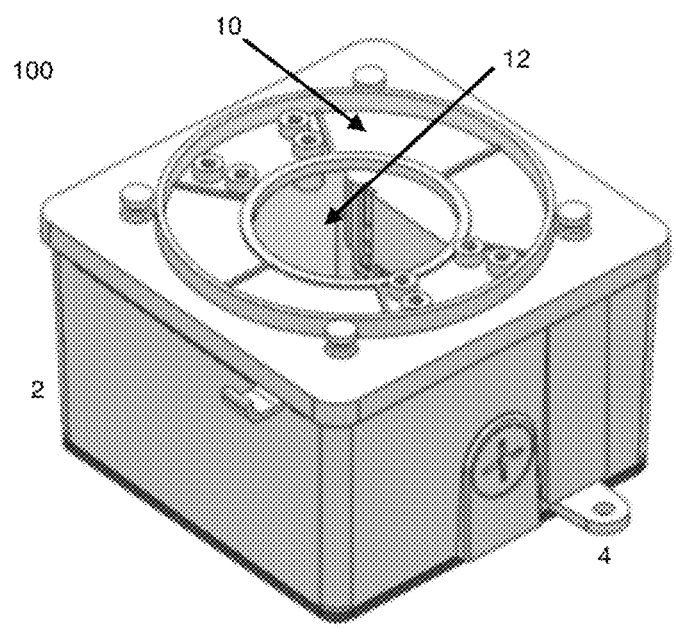
FIG. 2 is a perspective view of an embodiment of the pass through junction box.

While the invention has been described in connection with certain preferred embodiments, other embodiments would be understood by one of ordinary skill in the art and are encompassed herein.

ELEMENTS WITH CORRESPONDING REFERENCE NUMERALS pass through junction box device 100
housing 2
housing mount 4
housing opening for electrical outlet 6
electrical outlet 8
electrical apparatus mount 10
opening for wiring of electrical apparatus 12
outlet face 14
outlet assembly 16
outlet yoke 18
manual switch 20
WiFi controller 22
electrical apparatus 24
outlet cover 26
alternate outlet cover 28
GFCI 30
four USB-A 32
two standard outlet (non-GFCI) with USB-A and USB-C 34
four USB 36
two USB and 12V automotive style connector 12V DC supply 38
audio control module 40
WiFi controller housing hole 42
housing opening for input of AC power 44
standard rectangular shape of the face of an outlet 46

DETAIL DESCRIPTION OF THE INVENTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. Well-known structures and devices are shown in order to facilitate describing the subject innovation. Moreover, it is to be appreciated that the drawings may not be to scale.

FIG. 1 is a perspective view of an embodiment of the pass through junction box 100. The pass through junction box 100 may include a variety of additional components. The pass through junction box 100 comprises a housing 2, input AC power, one or more housing mounts 4, one or more housing openings for installation of electrical outlets 6 (not shown), one or more electrical outlets 8 (not shown), one or more electrical apparatus mounts to attach at least one electrical apparatus to the housing 10, a means to provide electrical power to at least one connected electrical apparatus, and one or more openings for installation of electrical delivery devices 44 (not shown).

The embodiment is an outdoor, weather resistant, rectangular electrical junction box with rear openings and side conduit plugged openings for input of electrical power. Although the shown embodiment has a rectangular housing 2, the housing may be in the form of any number of shapes, including but not limited to: rectangular, square, cylindrical, or round.

Figure 19:
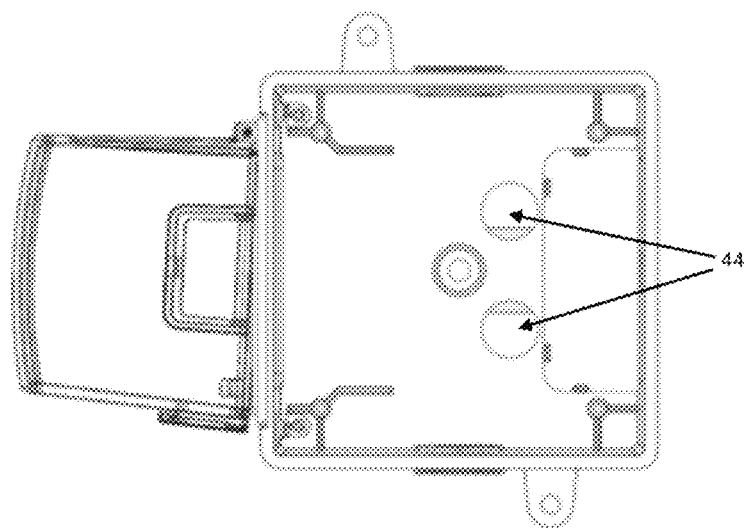
FIG. 19 is a plan view of an embodiment of the pass through junction box.

FIG. 19 is a plan view of another embodiment of the pass through junction box 100. The one or more housing openings for input of AC power 44 may be, but are not limited to: holes in the rear and screw in conduit connector opening on the sides, inputs on the rear or sides, removable knockouts, screw in conduit connector openings, armored cable inputs, and strain relief inputs.

The pass through junction box 100 may comprise a removable electrical outlet 8. The removable electrical outlet 8 is attached from the inside of the housing 2 and the one or more housing openings for electrical outlets 6 accommodate the standard rectangular shape of the face of an outlet 46 of an outlet assembly 16. A top and bottom yoke 18 of the outlet assembly attach within the housing.

Figure 3:
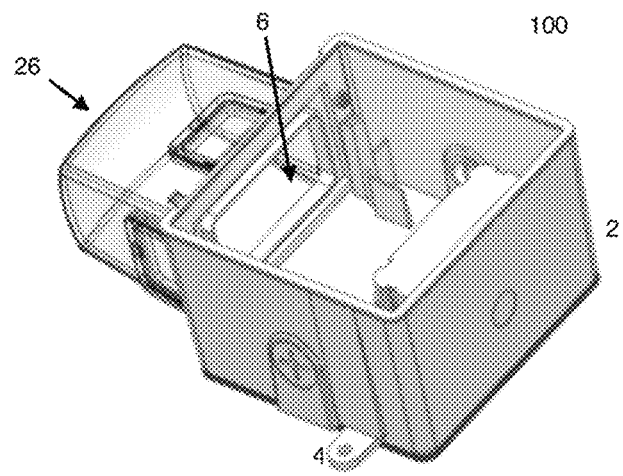
FIG. 3 is a perspective view of an embodiment of the pass through junction box.
Figure 4:
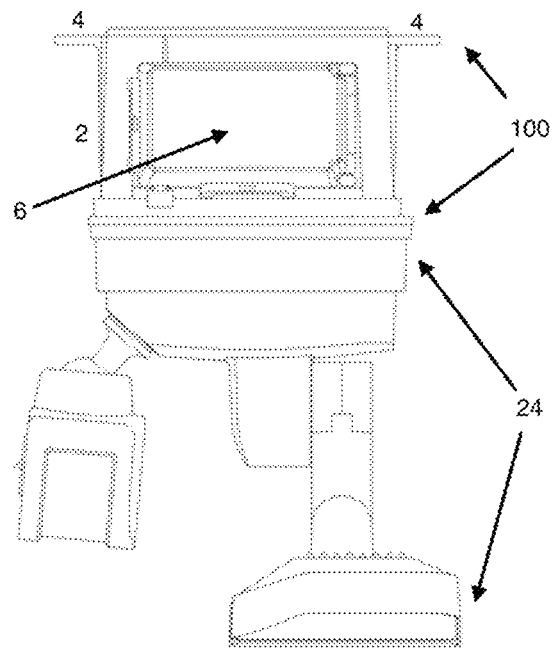
FIG. 4 is an elevational view of an embodiment of the pass through junction box.

FIG. 3 is a perspective view of an embodiment of the pass through junction box 100. The one or more electrical outlets 8 (not shown) may be, but are not limited to: weather resistant GFCI outlets, weather resistant GFCI outlets with outlet covers, duplex outlets, single outlets, standard outlets, standard weather resistant outlets, GFCI outlets, USB outlets, USB-A outlets, USB-micro outlets, USB-C outlets, combinations of electrical outlets and USB outlets, any number of other electrical delivery devices, DC outputs, AC outputs, and power connectors. The one ore more electrical outlets 8 are installed within the one or more housing openings for electrical outlets 6.

The pass through junction box 100 may comprise one or more WiFi controllers. The input AC power routes through the one or more WiFi controllers which provides WiFi controlled on/off and/or timer control of the one or more electrical outlets, and provide a second WiFi controlled on/off and/or timer control of a connected electrical apparatus. The pass through junction box 100 may comprise wireless control through RF, Bluetooth, WiFi, Zigbee, Zwave, or any other wireless transmission method through use of a computer, mobile device, or web-based application.

Figure 5:
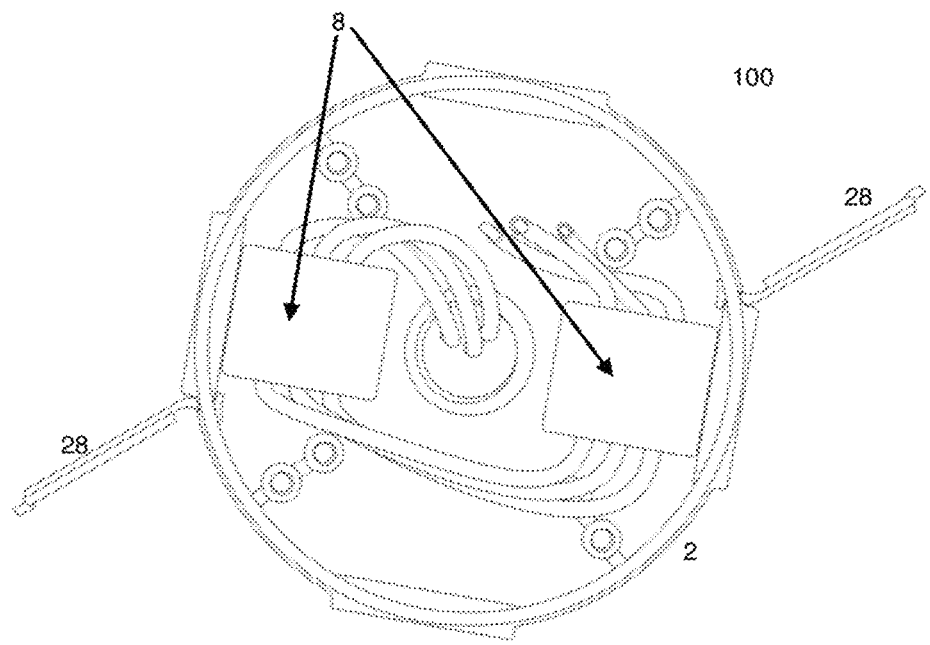
FIG. 5 is a plan view of an embodiment of the pass through junction box with a circular housing.
Figure 6:
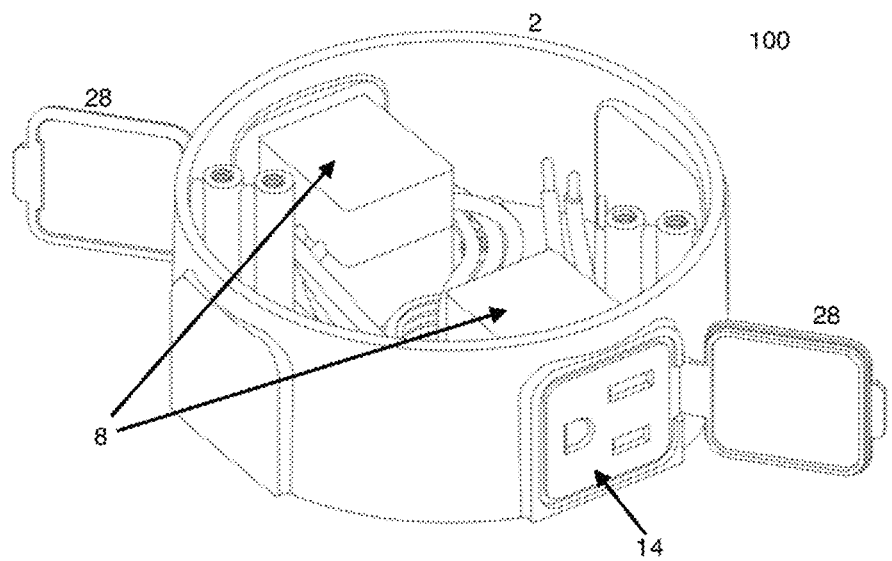
FIG. 6 is a perspective view of an embodiment of the pass through junction box with a circular housing.

FIG. 5 and FIG. 6 illustrate an embodiment of the pass through junction box with a circular housing. The shape of the enclosure is not limited to a rectangular junction box, but may be cylindrical, square, round or any number of other shapes. The circular embodiment comprises a housing, input AC power, one or more housing mounts, one or more housing openings for electrical outlets, one or more electrical outlets, one or more electrical apparatus mounts to attach at least one electrical apparatus to the housing, and a means to provide electrical power to at least one connected electrical apparatus.

Figure 7:
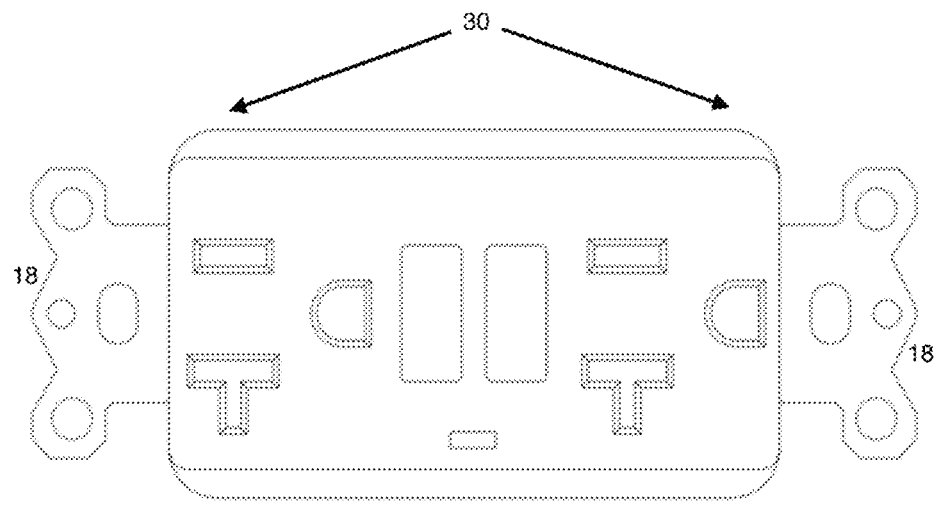
FIG. 7 is an elevational view of a GFCI.

FIG. 7 is an elevational view of a GFCI. Embodiments of the current invention may contain a removable piece/assembly (GFCI) that is screwed from the inside of the box having advantages over alternate designs. The ability to remove the GFCI outlets screwed from inside the box allows for the smallest design in the height and width of the product while maintain the wet/damp location ratings. The enclosure opening only has to accommodate the standard rectangular shape of the face of the outlet as compared to a larger enclosure that would be necessary to also accommodate the top and bottom yokes of the outlet assembly and the full width of the GFCI outlet assembly.

Figure 8:
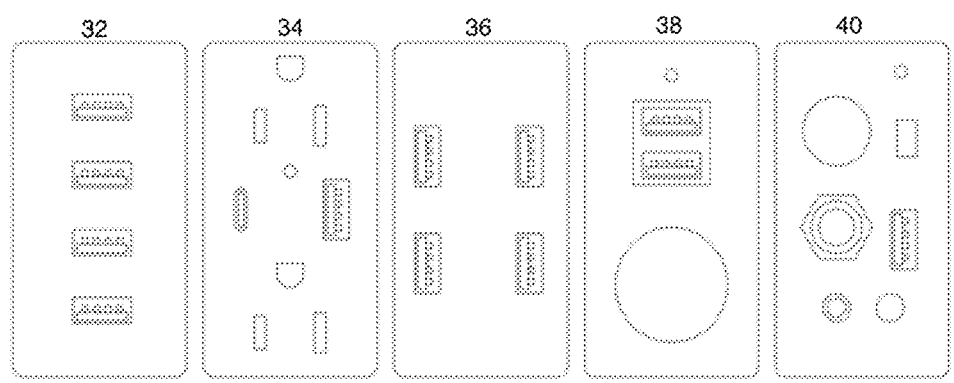
FIG. 8 is an elevational view of five different electrical outlets.

FIG. 8 is an elevational view of five different electrical outlets. Numerous in-wall electrical outlets may be installed in place of the GFCI outlet 30 to give the consumer more flexibility in having access to electrical power separate from the connected electrical apparatus.

Embodiments include, but are not limited to: four USB-A 32, two standard outlet (non-GFCI) with USB-A and USB-C 34, four USB 36, two USB and 12V automotive style connecter 12V DC supply 38, and audio control module 40.

Figure 9:
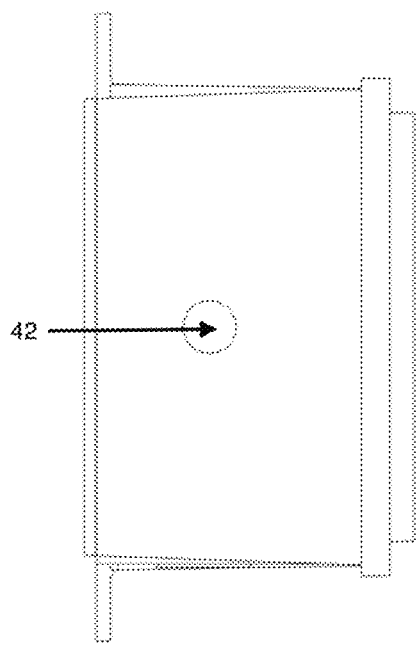
FIG. 9 is an elevational view of an embodiment of the pass through junction box with a WiFi controller.
Figure 10:
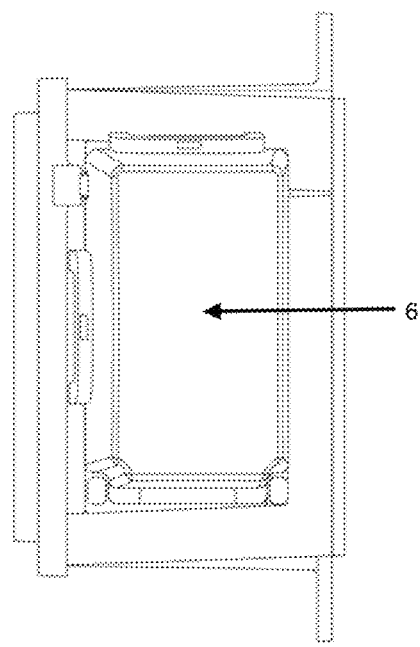
FIG. 10 is another elevational view of an embodiment of the pass through junction box with a WiFi controller.
Figure 11:
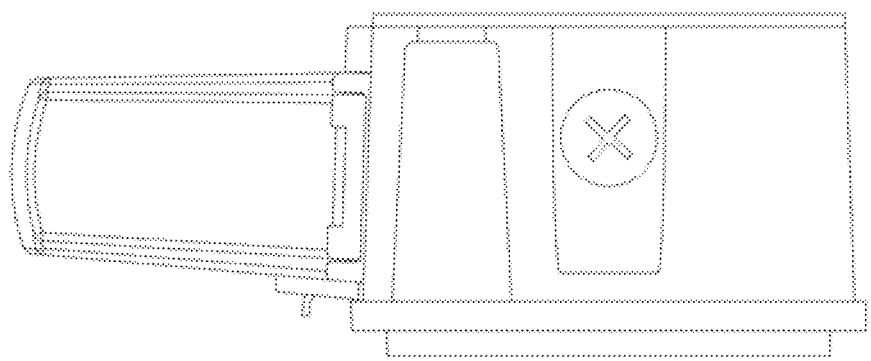
FIG. 11 is an elevational view of an embodiment of the pass through junction box.
Figure 12:
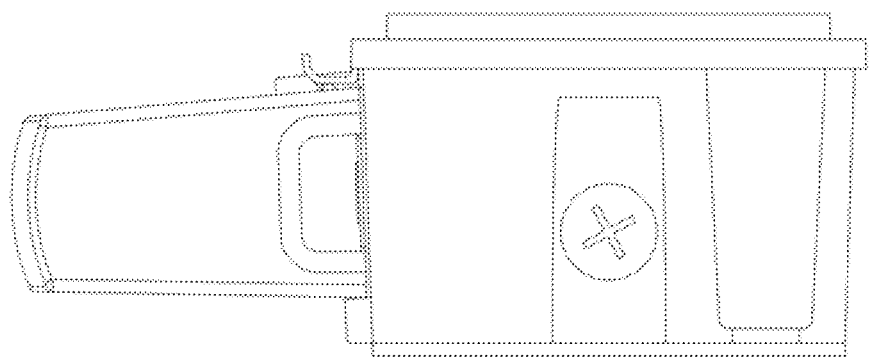
FIG. 12 is an elevational view of an embodiment of the pass through junction box.
Figure 13:
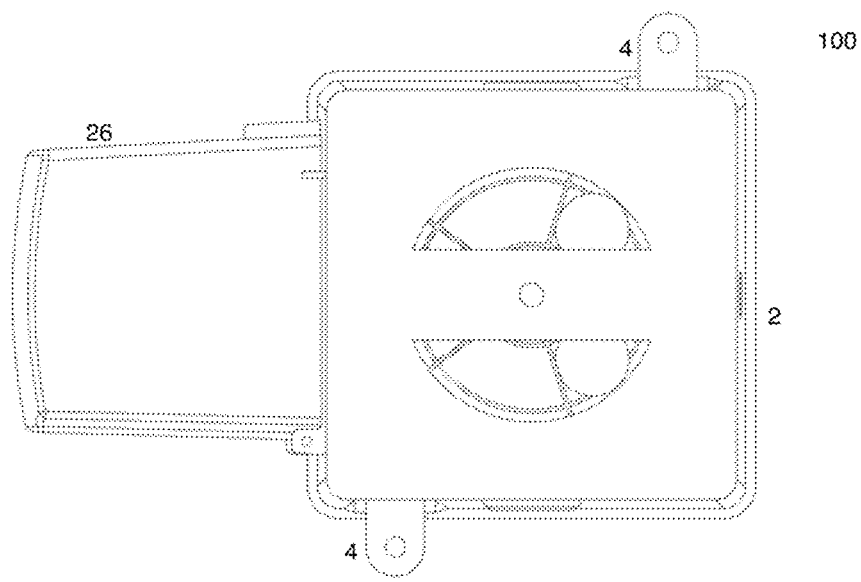
FIG. 13 is a plan view of an embodiment of the pass through junction box.

FIG. 9 and FIG. 10 are elevational views of an embodiment of the pass through junction box 100 with a WiFi controller. The embodiment routes input AC power through one WiFi controller 22 (not shown), which provides WiFi based on/off and timer control of the 15A GFCI outlets and a second WiFi based on/off and timer control of a 5A maximum connected electrical apparatus.

Figure 14:
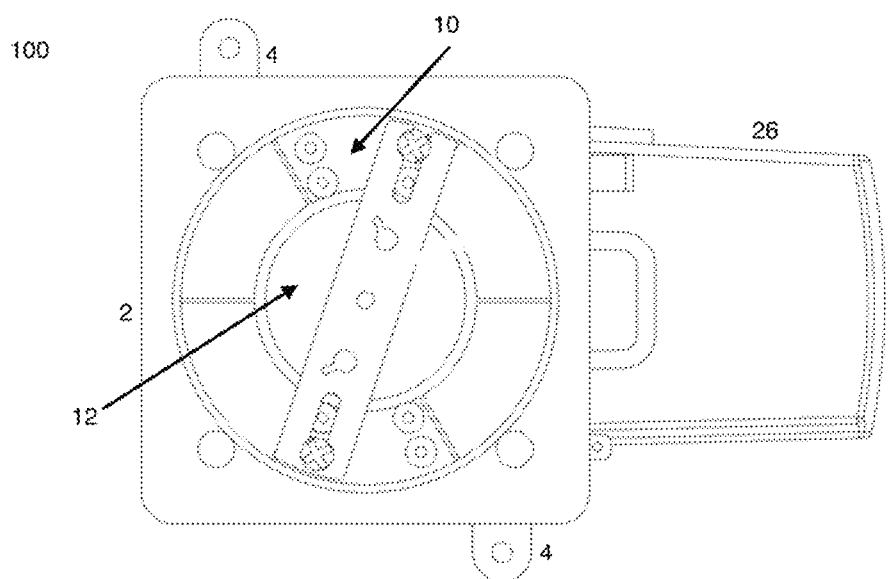
FIG. 14 is an elevational view of an embodiment of the pass through junction box.
Figure 15:
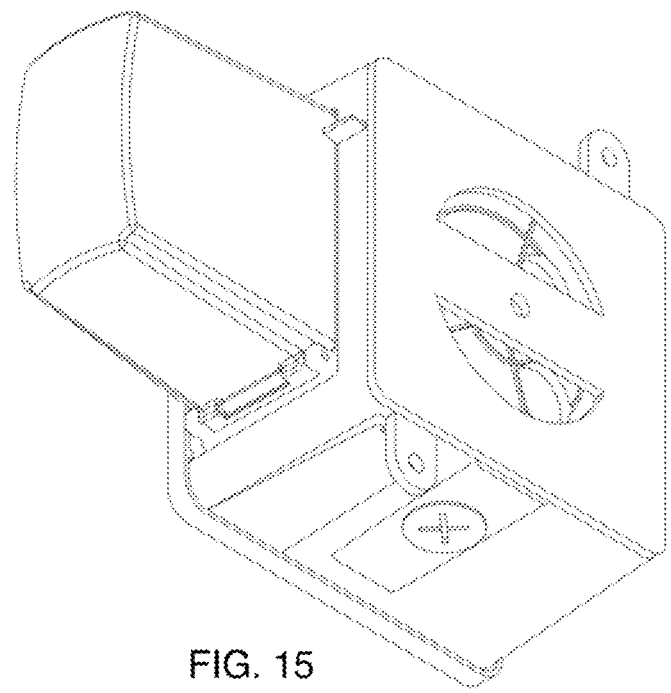
FIG. 15 is a perspective view of an embodiment of the pass through junction box.
Figure 16:
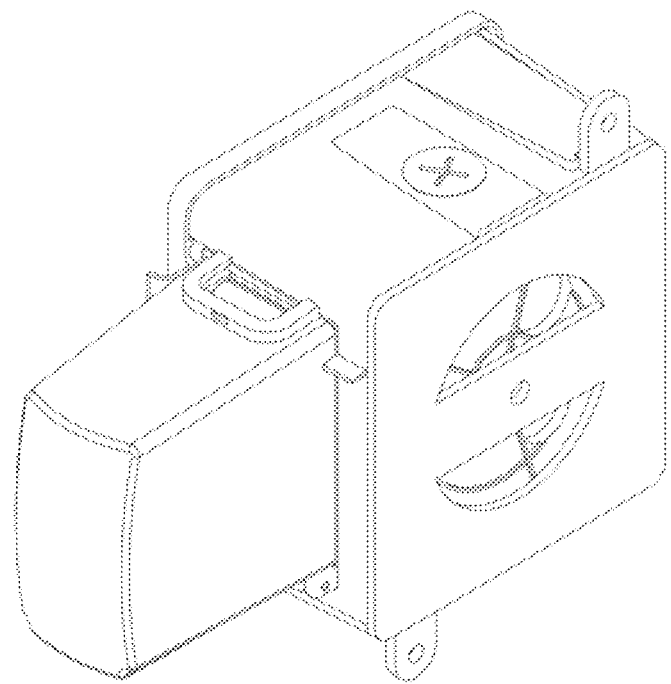
FIG. 16 is a perspective view of an embodiment of the pass through junction box.

FIG. 14 is an elevational view of an embodiment of the pass through junction box 100. The embodiment provides a means for mechanically mounting and providing electrical power to a connected electrical apparatus. The junction box device provides a standard 4" electrical junction box mechanical interface for mounting and providing electrical power to a connected electrical apparatus such as a lighting apparatus, security camera, etc.

The provided electrical power may only pass through the input electrical power or may also condition the input power to any output AC or DC output to support the connected device.

Figure 17:
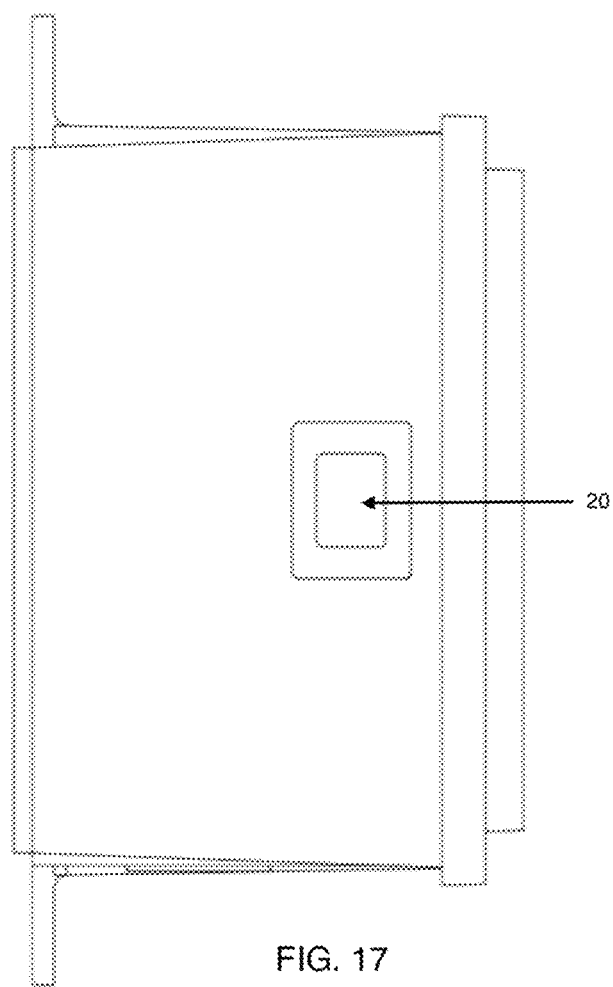
FIG. 17 is an elevational view of an embodiment of the pass through junction box with a manual switch.
Figure 18:
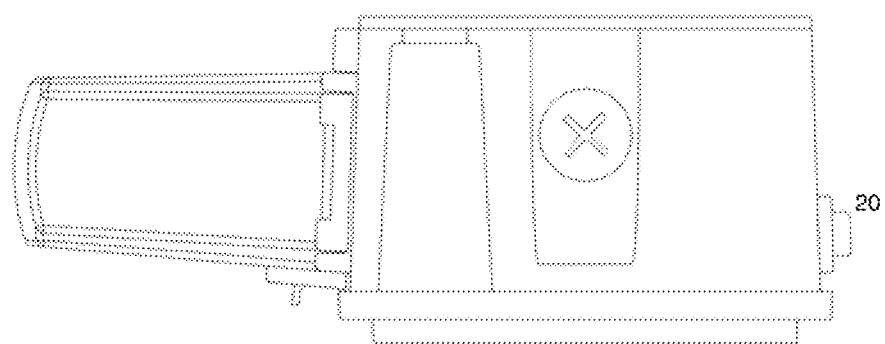
FIG. 18 is another elevational view of an embodiment of the pass through junction box with a manual switch.

FIG. 17 and FIG. 18 are elevational views of an embodiment of the pass through junction box 100 with a manual switch 20. The embodiment routes input AC power directly to 15A GFCI outlets 30 and to a manual on/off 5A switch 20 which provides power to a connected electrical apparatus 24. The manual switching option provides control over the connected electrical devices and apparatuses 24.

In another embodiment of the present invention, the pass through junction box 100 may comprise a GFCI outlet and a WiFi controller 22. House wiring may enter into the junction box housing 2 to the WiFi controller 22, where the WiFi controller 22 has multiple sets of independently controlled outputs. One set of L-N-G wires goes to the GFCI outlet 30, and the other set of L-N-G wires passes through the front of the junction box housing 2 to a connected lighting device, or any other electrical apparatus 24.

The present embodiment provides WiFi control to a GFCI device. The WiFi controlled GFCI device may fit into a standard wall sized outlet box. The module provides a single product solution for WiFi control of a GFCI outlet 30 indoors, or outdoors. In addition, it provides WiFi control in a wet location rated to any electrical product that has the standard rectangular outlet configuration and utilizes I20 VAC power.

The pass through junction box 100 may comprise one or more switches. The one or more switches 20 may provide power to the at least one connected electrical apparatus 24. The one or more switches 20 may provide power to the one or more electrical inputs 8.

Although the present invention has been described in relation to particular embodiments thereof, many other variations and modifications will become apparent to those skilled in the art. It is preferred, therefore, that the present invention be limited not by the specific disclosure herein, but only by the appended claims. Alternative embodiments may be devised without departing from the spirit or scope of the invention. Further, the particular feature or structure may be combined in any suitable manner in one or more embodiments.

What is claimed is:

1. An electrical device comprising:
 a housing;
 input AC power;
 one or more housing mounts;
 one or more housing openings for input of AC power, whereas at least one of the one or more housing openings for input of AC power accommodate the entry of an external line wire, an external neutral wire, and an external ground wire into the housing;
 one or more housing openings for installation of electrical outlets;
 one or more electrical apparatus mounts to attach at least one electrical apparatus to the housing;
 a standard four inch round electrical junction box mechanical interface;
 the standard four inch round electrical junction box mechanical interface configured to mount the at least one electrical apparatus;
 a line wire;
 a neutral wire;
 a ground wire; and
 the line wire, the neutral wire, and the ground wire provide electrical power to the at least one electrical apparatus, and directly electrically connect to a separate line wire, a separate neutral wire and a separate ground wire supplied by the at least one electrical apparatus.

2. The electrical device as claimed in claim 1, further comprising:
 at least one WiFi controller;
 the input AC power routes through the at least one WiFI controller; and
 the at least one WiFi controller provides WiFi control of the at least one electrical apparatus and one or more of the electrical outlets, including: on and off control, and at least one additional functionality control.

3. The electrical device as claimed in claim 1, further comprising:
 one or more switches; and
 the one or more switches controls power to the at least one connected electrical apparatus.

4. The electrical device as claimed in claim 1, further comprising:
 one or more electrical outlets;
 one or more switches; and
 the one or more switches provides power to the one or more electrical outlets.

5. The electrical device as claimed in claim 1, further comprising:
 the electrical device functions properly in wet and dry locations; and
 the electrical device configured to be installed in indoor and outdoor locations.

6. The electrical device as claimed in claim 1, further comprising:
 the housing configured to be in the form of any number of shapes, including but not limited to: rectangular, square, cylindrical, round, geometric, or irregular.

7. The electrical device as claimed in claim 1, further comprising:
 the one or more housing openings for input of AC power configured to be, but are not limited to: holes in the rear and screw in conduit connector opening on the sides, inputs on the rear or sides, removable knockouts, screw in conduit connector openings, armored cable inputs, and strain relief inputs.

8. The electrical device as claimed in claim 1, further comprising:
one or more electrical outlets; and
the one or more electrical outlets configured to be, but are not limited to: weather resistant GFCI outlets, weather resistant GFCI outlets with outlet covers, duplex outlets, single outlets, standard outlets, standard weather resistant outlets, GFCI outlets, USB outlets, USB-A outlets, USB-micro outlets, USB-C outlets, combinations of electrical outlets and USB outlets, any number of other electrical delivery devices, DC outputs, AC outputs, and power connectors.

9. The electrical device as claimed in claim 1, further comprising wireless control through any one of the following methods: RF, Bluetooth, WiFi, Zigbee, Zwave, or any other wireless transmission method through use of a computer, mobile device, or web-based application.

10. The electrical device as claimed in claim 1, further comprising:
one or more electrical outlets;
one or more electrical outlet yokes;
the one or more electrical outlet yokes are configured to attach to and from the inside of the housing;
the one or more electrical outlets are removable;
the one or more removable electrical outlets are attached to an inside of the housing;
the one or more removable electrical outlets are configured to be installed and removed from the inside of the housing; and
the one or more openings for outlets of electrical power accommodate the standard rectangular shape of a face of an outlet of an outlet assembly.

11. The electrical device as claimed in claim 1, further comprising:
one or more removable plugs for the housing openings for installation of electrical outlets; and
the one or more housing openings for installation of electrical outlets are configured to be perpendicular to the standard four inch round electrical junction box mechanical interface.

12. An electrical device comprising:
a housing;
input AC power;
one or more housing mounts;
one or more housing openings for input of AC power, whereas at least one of the one or more housing openings for input of AC power accommodate the entry of an external line wire, an external neutral wire, and an external ground wire into the housing;
one or more electrical outlets;
one or more electrical apparatus mounts to attach at least one electrical apparatus to the housing;
a standard four inch round electrical junction box mechanical interface;
the standard four inch round electrical junction box mechanical interface configured to mount the at least one electrical apparatus;
a line wire;
a neutral wire;
a ground wire;
the line wire, the neutral wire, and the ground wire provide electrical power to the at least one electrical apparatus and directly electrically connect to a separate line wire, a separate neutral wire, and a separate ground wire supplied by the at least one electrical apparatus;
one or more housing openings for installation of electrical outlets;
at least one WiFi controller;
the input AC power routes through the at least one WiFi controller; and
the at least one WiFi controller provides WiFi control of the at least one electrical apparatus and one or more of the electrical outlets, including: on and off control, and at least one additional functionality control;
one or more switches; and
the one or more switches provide power to at least one of the following: the at least one connected electrical apparatus, the one or more electrical outlets; or the electrical device is weather resistant.

13. The electrical device as claimed in claim 12, further comprising:
a second standard four inch round electrical junction box mechanical interface; and
the second standard four inch round electrical junction box mechanical interface accommodates a recessed standard four inch round electrical junction box or a surface mount standard four inch electrical junction box, whereas the second standard four inch round electrical junction box mechanical interface is configured to mount the housing to a flat surface, which include, but are not limited to: a wall, a ceiling, or an overhang.

14. The electrical device as claimed in claim 12, further comprising:
the at least one electrical outlet is configured to be removable;
at least one removable electrical outlet yoke;
the at least one removable outlet yoke is configured to attach to and from the inside of the housing;
the one or more housing openings for installation of electrical outlets accommodate the standard rectangular shape of the face of an electrical outlet; and
the at least one electrical outlet is configured to be installed and removed from the inside of the housing.

15. An electrical device comprising:
a housing;
input AC power;
one or more housing mounts;
one or more housing openings for input of AC power, whereas at least one of the one or more housing openings for input of AC power accommodate the entry of an external line wire, an external neutral wire, and an external ground wire into the housing;
one or more housing openings for installation of electrical outlets;
one or more electrical apparatus mounts to attach at least one electrical apparatus to the housing;
a standard four inch round electrical junction box mechanical interface;
the standard four inch round electrical junction box mechanical interface configured to mount the at least one electrical apparatus;
a line wire;
a neutral wire;
a ground wire;
the line wire, the neutral wire, and the ground wire provide electrical power to the at least one electrical apparatus and directly electrically connect to a separate line wire, a separate neutral wire, and a separate ground wire supplied by the at least one electrical apparatus;
a second standard four inch round electrical junction box mechanical interface; and
the second standard four inch round electrical junction box mechanical interface accommodates a recessed standard four inch round electrical junction box or a surface mount standard four inch electrical junction box, whereas the second standard four inch round electrical junction box mechanical interface is configured to mount to a flat surface, which include, but are not limited to: a wall, a ceiling, or an overhang.

16. The electrical device as claimed in claim 15, further comprising:
    the at least one electrical outlet is configured to be removable;
    at least one removable electrical outlet yoke;
    the at least one removable outlet yoke is configured to attach to and from the inside of the housing;
    the one or more housing openings for installation of electrical outlets accommodate the standard rectangular shape of the face of an electrical outlet; and
    the at least one electrical outlet is configured to be installed and removed from the inside of the housing.

17. The electrical device as claimed in claim 15, further comprising:
    the at least one WiFi controller provides WiFi control of the at least one electrical apparatus and one or more of the electrical outlets, including: on and off control, and at least one additional functionality control.

* * * * *